United States Patent [19]

Thaler et al.

[11] 4,120,049
[45] Oct. 10, 1978

[54] LINE MEMORY

[75] Inventors: Michael Thaler, East Hartford; Ronald Gocht, Manchester, both of Conn.

[73] Assignee: Scan-Optics, Inc., East Hartford, Conn.

[21] Appl. No.: 809,697

[22] Filed: Jun. 24, 1977

[51] Int. Cl.² .................... G11C 11/26; G11C 8/00
[52] U.S. Cl. .................... 365/230; 340/146.3 MA
[58] Field of Search ... 340/173 R, 173 RC, 146.3 MA, 340/173 CR

[56] References Cited

U.S. PATENT DOCUMENTS 4,051,457  9/1977  Inose .................... 340/173 RC

Primary Examiner—Terrell W. Fears
Attorney, Agent, or Firm—Brumbaugh, Graves, Donohue & Raymond

[57] ABSTRACT

In a character recognition system lines of data are stored in a line memory via a series of multiplexers. The data can originate in a controller for the system, a character reading station or other sub-systems, and is supplied to the line memory over a controller bus, a transport bus and a line memory bus, respectively. Although stored in line form, two-dimensional sub-arrays of the data in various configurations can be accessed directly by the other sub-systems of the recognition system via the multiplexers and the line memory bus, without the interaction of the controller bus.

4 Claims, 4 Drawing Figures

X- Address →

| | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| 0 | 0 0 | 1 0 | 2 0 | 3 0 | 4 0 | 5 0 | 6 0 | 7 0 | 8 0 | 9 0 | 10 0 | 11 0 | 12 0 | 13 0 | 14 0 | 15 0 | 0 128 | 1 128 | 2 128 |
| 1 | 4 1 | 5 1 | 6 1 | 7 1 | 8 1 | 9 1 | 10 1 | 11 1 | 12 1 | 13 1 | 14 1 | 15 1 | 0 1 | 1 1 | 2 1 | 3 1 | 4 129 | 5 129 | 6 129 |
| 2 | 8 2 | 9 2 | 10 2 | 11 2 | 12 2 | 13 2 | 14 2 | 15 2 | 0 2 | 1 2 | 2 2 | 3 2 | 4 2 | 5 2 | 6 2 | 7 2 | 8 130 | 9 130 | 10 130 |
| 3 | 12 3 | 13 3 | 14 3 | 15 3 | 0 3 | 1 3 | 2 3 | 3 3 | 4 3 | 5 3 | 6 3 | 7 3 | 8 3 | 9 3 | 10 3 | 11 3 | 12 131 | 13 131 | 14 131 |
| 4 | 0 4 | 1 4 | 2 4 | 3 4 | 4 4 | 5 4 | 6 4 | 7 4 | 8 4 | 9 4 | 10 4 | 11 4 | 12 4 | 13 4 | 14 4 | 15 4 | 0 132 | 1 132 | 2 132 |
| 5 | 4 5 | 5 5 | 6 5 | 7 5 | 8 5 | 9 5 | 10 5 | 11 5 | 12 5 | 13 5 | 14 5 | 15 5 | 0 5 | 1 5 | 2 5 | 3 5 | 4 133 | 5 133 | 6 133 |
| 6 | 8 6 | 9 6 | 10 6 | 11 6 | 12 6 | 13 6 | 14 6 | 15 6 | 0 6 | 1 6 | 2 6 | 3 6 | 4 6 | 5 6 | 6 6 | 7 6 | 8 134 | 9 134 | 10 134 |
| 7 | 12 7 | 13 7 | 14 7 | 15 7 | 0 7 | 1 7 | 2 7 | 3 7 | 4 7 | 5 7 | 6 7 | 7 7 | 8 7 | 9 7 | 10 7 | 11 7 | 12 135 | 13 135 | 14 135 |
| 8 | 0 8 | 1 8 | 2 8 | 3 8 | 4 8 | 5 8 | 6 8 | 7 8 | 8 8 | 9 8 | 10 8 | 11 8 | 12 8 | 13 8 | 14 8 | 15 8 | 0 136 | 1 136 | 2 136 |
| 9 | 4 9 | 5 9 | 6 9 | 7 9 | 8 9 | 9 9 | 10 9 | 11 9 | 12 9 | 13 9 | 14 9 | 15 9 | 0 9 | 1 9 | 2 9 | 3 9 | 4 137 | 5 137 | 6 137 |
| 10 | 8 10 | 9 10 | 10 10 | 11 10 | 12 10 | 13 10 | 14 10 | 15 10 | 0 10 | 1 10 | 2 10 | 3 10 | 4 10 | 5 10 | 6 10 | 7 10 | 8 138 | 9 138 | 10 138 |
| 11 | 12 11 | 13 11 | 14 11 | 15 11 | 0 11 | 1 11 | 2 11 | 3 11 | 4 11 | 5 11 | 6 11 | 7 11 | 8 11 | 9 11 | 10 11 | 11 11 | 12 139 | 13 139 | 14 139 |

↓ Y- Address

*FIG. 4*

LINE MEMORY

BACKGROUND OF THE INVENTION

The present invention relates to character recognition systems and, more particularly, to memory units for use in character recognition.

In character recognition systems the document to be read is located in a reading station by means of a document transport. At the reading station the difference in reflectance between a character and the document background is detected optically and is converted into an electrical signal that is stored in a memory. This conversion can be done a line at a time and the data can be stored in a line memory. Once in the line memory the data can be searched to locate the character perimeter and can be processed (e.g. thinned and scaled) as shown in U.S. Pat. No. 3,541,511 to Genchi et al. Then the data is transferred to a classifier memory where the character is identified, e.g., by comparing the data to character masks such as is explained in U.S. Pat. No. 3,766,520 of Patterson.

The typical line memory stores lines of data (e.g. words) which can be read out in line or word form under the control of the system controller. While this is a convenient way to store data, it is an inefficient form for the data when its perimeter is sought. The top, bottom, left and right edges of the character can be located more easily if two-dimensional arrays of rows and columns of the memory are supplied to a position detector or perimeter detector circuit. Also, the area of the character is more easily determined with such an array of data.

With most character recognition systems information from the line memory is obtained by the controller and is fed to a position detector or perimeter trace circuit where it is determined if the data contains part of the transition from the background to the character or vise versa. The position detector itself may be under program control either from the controller or its own computer. Such a procedure is slow and inefficient, since the steps of reading and executing instructions must be carried out with the system controller. Therefore, a faster and more efficient machine could be realized if the line memory was capable of supplying 4×4 arrays of data to the position detector independent of the system controller on its bus.

SUMMARY OF THE INVENTION

The present invention is directed to providing a line memory for a character recognition system which allows the loading of lines of data into the memory and the extraction of two-dimensional arrays of data by various units of the system independently of the system controller. This object is achieved by providing multiplexers at the input and output of the memory and a line memory (LM) bus connecting the line memory with the other units of the system.

In an illustrative embodiment of the invention a line memory of a character recognition system comprises a number of dynamic memory units, each having a storage structure of one bit by several thousand bits. The inputs of the memory units are connected to the outputs of multiplexers. The outputs of the multiplexers are also connected to a line memory bus (LM-Bus) via latch circuits. The inputs to the multiplexers are connected to an internal memory bus to which outputs of the memory units are connected. By controlling the multiplexers and the address controls of the memory, a line of the character data can be fed into the memory and arrays of the data, e.g. 4×4 arrays, can be read out for position detection and classification of the character represented by the data.

The LM-Bus allows sub-assemblies of the recognition system, e.g. the position detector, to directly access the memory independently of the controller for the system. The multiplexers allow the arrays of data to be assembled from the stored lines of data. Once assembled, the arrays of data are stored in the latch circuits from which they can be fed over the LM-Bus to the sub-assemblies or be arranged into different configurations in a set of driver circuits and supplied over the controller bus (B-Bus) to the system controller.

In a preferred embodiment the memory is provided with a recursive mode which allows sequential arrays of data to be automatically supplied to the LM-Bus. This is a particularly useful mode when combined with a hardware implemented character position or perimeter trace circuit.

BRIEF DESCRIPTION OF THE DRAWINGS

The foregoing and other features of the present invention will be more readily apparent from the following detailed description and drawings of an illustrative embodiment of the invention in which:

FIG. 4 is a functional diagram of a part of the memory of FIG. 3.

DESCRIPTION OF AN EXEMPLARY EMBODIMENT

Figure 1:
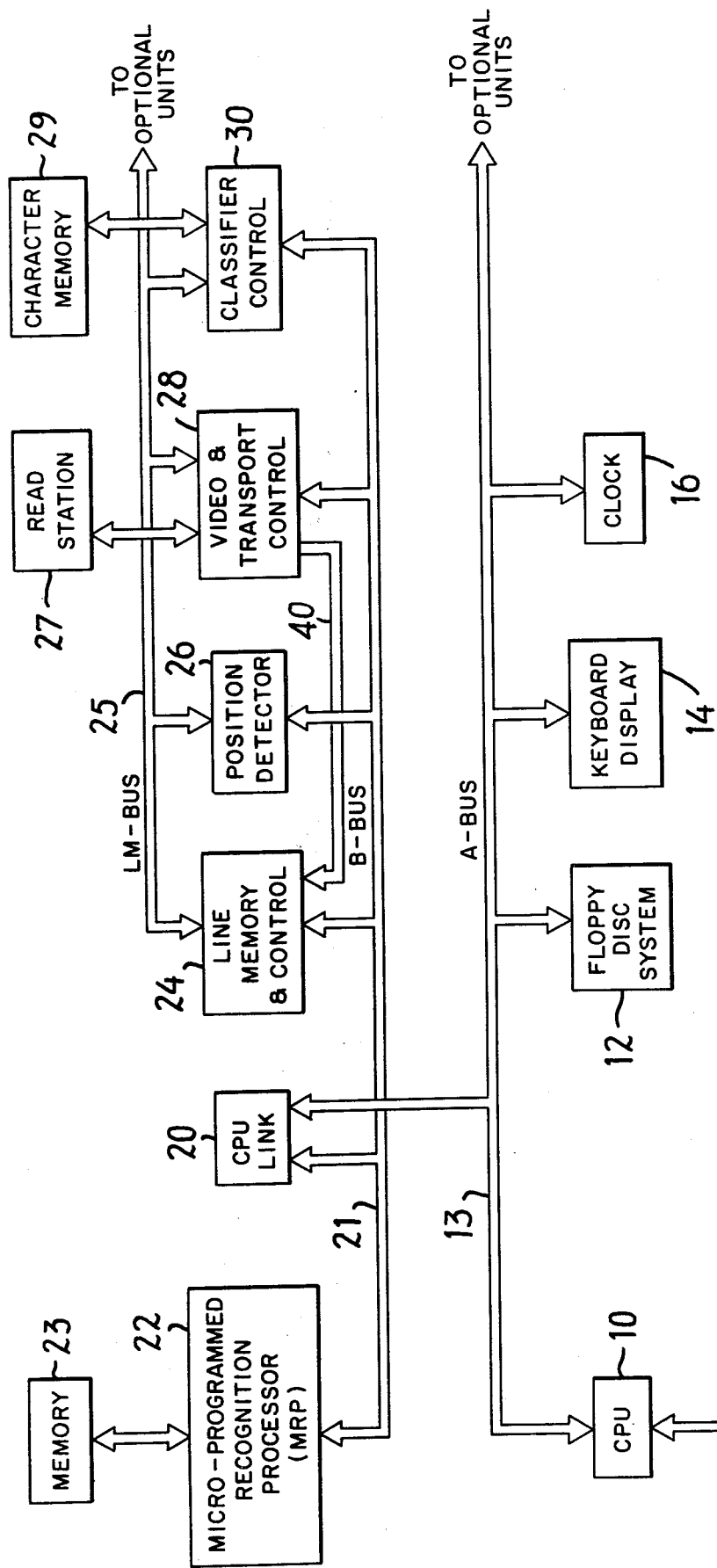
FIG. 1 is a block diagram of a character recognition system indicating the location of a line memory according to the present invention.

A character recognition system is shown in block diagram form in FIG. 1. External control of this system is maintained by a central processing unit (CPU) 10, such as a Hewlett-Packard computer model 21MK with its associated 16K memory 11. The computer 10 interfaces with each other unit along a single bus 13, labeled the "A-Bus." Connected to the A-Bus is a floppy disc memory system 12, such as the Shugart 801 disc, which is an inexpensive way of providing additional memory space. The floppy disc system may be used to store operating parameters or as an output storage for the system. In order for the operator to instruct the system about the size of the document, the type of font used, the location of the data, etc., a keyboard and CRT display unit 14 is provided. This may be a Computer Peripheral Corp. model CP-10 unit. A system clock 16 may also be attached to the A-Bus to provide timing in a conventional manner.

The CPU, floppy disc and keyboard are used to set up or initialize the system prior to reading a document, but the recognition of characters is carried out by a microprogrammed recognition processor (MRP) 22 connected to the A-Bus via a CPU link 20. The CPU link is a set of receivers, drivers and decoders that condition the signals from the CPU 10 so that they can be accepted by the MRP. The MRP 22 may be a conventional processor such as a Hewlett Packard 21MK, an especially designed processor made from integrated circuits such as the bit slice microprocessor chips of the 2901 series manufactured by American Micro Devices, or a simple sequencer. Naturally, more speed and versatility can be achieved by making use of a processor for the MRP in connection with its own memory 23, but since this forms no part of the invention it will be described as a simple squencer.

Once the CPU 10 has established the initial conditions, control of the system is turned over to the MRP 22. The MRP operates to control the system by means of a bus 21, known as the B-Bus. Data, addresses and control signals are communicated between the MRP and the other sub-assemblies of the system over the B-Bus. The sub-assemblies include a video and transport control unit 28 which causes a document to be incrementally moved pass a read station 27 where a line of data is read after each incremental move. This data is stored in the line memory 24 of the present invention via a transport bus 40. The transport can be any convenient incremental document drive, but the document drive described in copending patent application Ser. No. (809,692) filed (concurrently herewith) by Daley et al. and assigned to the assignee of the present application, is particularly suited for this purpose. Also the read station can be a charged coupled device, such as the Fairchild CCD-121H, with suitable lenses to image a line of data on it and suitable amplifiers and level discriminators to generate a line of binary data.

After a sufficient number of lines have been stored to form at least one character field, the MRP activates the position detector 26, which locates the left, right, top and bottom margins of the character. In some cases this unit may also be used to determine the total number of black points, i.e. charcter data points, within the character margins as an aid to the identification of the character. All of these operations by the position control are performed independently of the MRP and the B-Bus. Instead data is transferred over a line memory (LM) bus 25 at the command of the position detector. A position detector that is capable of operation in this fashion is disclosed in copending application Ser. No. 809,695 filed (concurrently herewith) by Thaler et al. and assigned to the assignee of the present invention. Upon completion of the margin search, data within the character margins is then transferred to the character memory 29 via the classifier control 30 and the LM-Bus. The MRP signals the classifier control when the position control has completed its task and sets the classifier into operation. In the classifier the data within the margins is compared to character masks which have been stored there. The character associated mask which most closely matches the data, i.e. the mask that receives the highest comparison score, is selected as the output and is fed to the CPU via thE B-Bus, the CPU Link 20 and the A-Bus. The classifier may be like that disclosed in U.S. Pat. No. 3,766,520 to Patterson or in the service manual for the Scan Optics Model 530/540 character recognition systems, pertinent portions of which are incorporated herein by reference.

Figure 2:
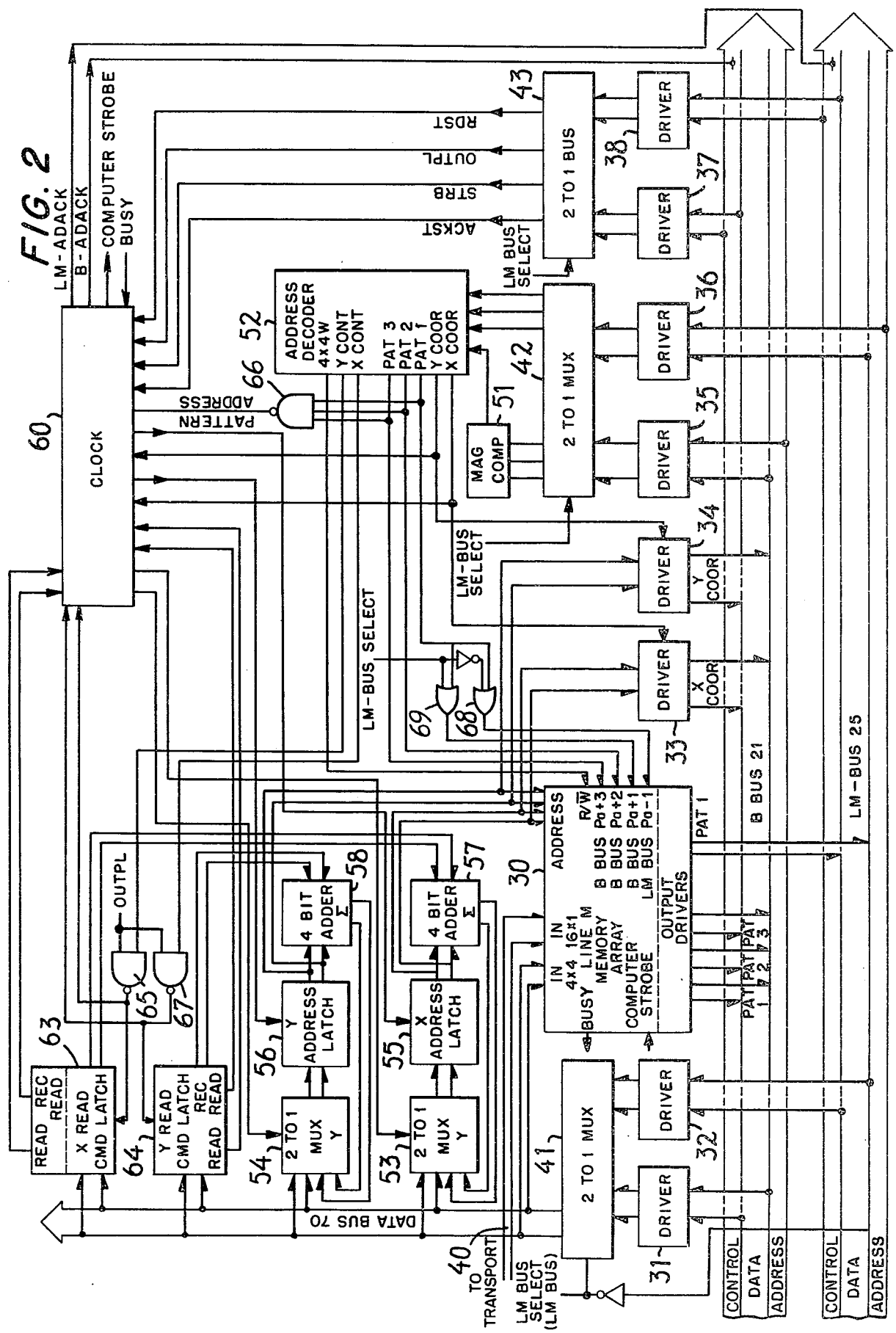
FIG. 2 is a schematic of the line memory and its associated controls.

The line memory control units that allow for this type of operation are disclosed in FIG. 2. Lines of data can be supplied to line memory array 30 over the B-Bus 21, the LM-Bus 25 or the transport bus 40. Typically the data from the read station will be in the form of a line of data about two thousand bits or less in length, which data is stored 16 bits at a time. However, when the data is read out of the memory it is in the form of a 4×4 array of the memory so as to aid in the identification of the character. The array identified as pattern 1, i.e. Pat. 1, is as follows:

| Pat. 1 | | | |
|---|---|---|---|
| 0 | 1 | 2 | 3 |
| 4 | 5 | 6 | 7 |
| 8 | 9 | 10 | 11 |
| 12 | 13 | 14 | 15 | where the numbers represent the bit position in the data word read out. This pattern can be applied to either the B-Bus or the LM-Bus. The B-Bus can also receive the data in a second or third pattern, i.e. PAT 2 or PAT 3, as follows:

| Pat. 2 | | | | Pat. 3 | | | |
|---|---|---|---|---|---|---|---|
| 0 | 4 | 8 | 12 | 15 | 14 | 13 | 12 |
| 1 | 5 | 9 | 13 | 11 | 10 | 9 | 8 |
| 2 | 6 | 10 | 14 | 7 | 6 | 5 | 4 |
| 3 | 7 | 11 | 15 | 3 | 2 | 1 | 0 |

The B-Bus and LM-Bus both consist of control lines data lines and address lines which are intercepted in the line memory control by driver-receiver circuits 31–38. These circuits can be standard integrated circuit units No. 8T37 produced by Fairchild, Texas Instruments or other manufacturers. The other standard integrated circuit units mentioned throughout the appplication can also be obtained from these manufacturers. Driver 31 connects the data lines of the B-Bus to a 2 to 1 multiplexer 41 and driver 32 connects the data lines of the LM-Bus to this multiplexer. This multiplexer can be made of standard integrated circuit units No. 74 LS 257. Whether the multiplexer 41 passes the B-Bus or LM-Bus data on to the memory array 30 is determined by an LM-Bus select signal (LM-Bus Select) generated by the sending unit on the LM-Bus line. Also, the drivers 35 and 36 connect the address lines of the B and LM-Bus, respectively, to a 2 to 1 multiplexer 42, which is also made of 75 LS 257 units controlled by the LM-Bus select signal. The multiplexer 42 supplies address information to a magnitude comparator 51. This comparator determines if the address of the data supplied on the bus lines corresponds to the address of the line memory. This comparator is a standard integrated circuit unit 74 LS 85. When comparator 51 determines that the data on the bus lines is intended for the line memory it produces an output that activates an address decoder 52 which also receives the address information from multiplexer 42. The address decoder is made up of standard integrated circuit units No. 74 LS 42. Control signals on the B-Bus and LM-Bus are received by drivers 37 and 38, respectively, and are multiplexed onto internal command lines (i.e. ACKST STRB, OUTPL and RDST) by 2 to 1 multiplexer 42 (standard unit No. 74 LS 257) under the command of the LM-Bus select signal.

The ACKST command is an acknowledge strobe command that requests the unit to state if it has decoded its address from the transmitted data. When the address has been decoded and data is ready to be read the address unit sends an ADACK, i.e. address acknowledge, signal back to the sending unit. The $\overline{\text{STRB}}$, i.e. strobe signal indicates to the unit that the data is to be stored if it is a "1" and read out if it is a "0". The latch load signal, OUTPL, loads data from one of the buses into a peripheral unit. Finally the RDST, read strobe, indicates the completion of a read cycle.

The outputs of the array in the three patterns for the B-Bus and the one pattern for the LM-Bus are from driver circuits internal to the memory array 30. Also, the X and Y address coordinates where the input data is being stored or where it is being read from is made available on the B-Bus by drivers 33 and 34.

The remaining circuits of FIG. 2 will now be explained by way of an example. During the reading of a document, lines of data in 16 bit words will be placed on the transport bus 40 by the video and transport control 28 in FIG. 1 along with a transport strobe and the address where the data should be stored. If the data originates at the MRP or another peripheral unit it will be in a 4×4 array and the LM-Bus select signal will set multiplexers 41–43 into the proper state to receive the data on either the B-Bus from the MRP or the LM-Bus from the other units. A write enable signal (4×4w) will be generated in the address decoder 52 and sent to the memory array 30. The data will be supplied to the input of the memory array and the address where it is to be stored in the array will be sent through X and Y multiplexers 53 and 54 (e.g. standard integrated circuit 2 to 1 multiplexer units 74 LS 257) to X and Y address latches (e.g. standard units 74 LS 174) 55 and 56, respectively. The output of the latches is supplied to the address input of the array.

The activation of multiplexers 53 and 54 and address latches 55 and 56 is under the control of a clock 60. The clock 60 is not shown in detail, but it may be a crystal clock circuit or it may be composed of an X series of three monostables and a Y series of the three monostables. The X series is initiated by coincidence between the OUTPL control signal from multiplexer 43 and an X CONT signal from address decoder 52 in gate 65 or coincidence (in a gate not shown) between the RDST command of multiplexer 43, the recursive read from an X READ command latch 63 and a pattern address signal created by ORing in gate 66 the PAT 1, PAT 2 and PAT 3 outputs of decoder 52. Similarly the Y series of monostables is initiated by coincidence between the OUTPL command and the Y CONT signal from decoder 52 in gate 67 or coincidence between the RDST command, the recursive read from a Y READ command latch 64 and the pattern address signal. The X and Y read command latches 63 and 64 are made from standard units No. 74174. They are fed via an internal data bus 70 with data from the external bus lines via multiplexer 41. This data includes information as to whether a regular read or a recursive read (which will be explained below) should be made and the size of the increment in the recursive mode.

The outputs of the ends of both series of monostables is ORed to form a reset signal for the first monostables of each series. In addition the outputs are ANDed with the READ outputs of the X and Y latches, respectively. These signals are combined in an OR gate to generate the computer strobe for the line memory array.

The X address multiplexer 53 is controlled by a flip flop in the X series and the X address latch 55 is triggered by either the output of the second monostable ANDed with either the STRB signal of multiplexer 43 or the inverse of the recursive read signal of the Y Read command latch 64, or the OUTPL signal of multiplexer 43 with the inverse of the X COOR signal of decoder 52. In a like manner the Y address multiplexer 54 is controlled by a flip flop in the Y series and the Y address latch 54 is triggered by either the second monostable ANDed with either the STRB signal or the inverse of the recursive read of the X Read command latch 63, or the OUTPL signal ANDed with the inverse of the Y COOR signal of decoder 52.

By using the series of monostables the addresses can be sequentially read or updated in the recursive mode without generating race conditions. The logic functions within the clock for strobing the address latches and generating the computer strobe are achieved with conventional logic gates combined as described above.

During an ordinary document read when a sufficient number of lines of data from the transport have been stored in the line memory, the MRP 22 will direct the position detector 26 to locate the margins of each character represented by the data in the array. In order to save time and to free the MRP for other functions, the line memory is designed so that the position detector can access its contents without the use of the MRP or the B-Bus, i.e. the position detector can obtain the data it needs to find the margins by directly accessing the line memory over the LM-Bus. Also, other subsystems, e.g. the classifier, can access the LM-Bus as long as some means is provided for storing the requests and possibly giving them some priority.

In order to read out a 4×4 array onto the LM-Bus the sub-system requiring the data puts line memory address information, a LM-Bus select signal and a PAT 1 code on the LM-Bus. This information is decoded in decoder 52 to create a PAT 1 signal that is combined with an LM-Bus select signal in gate 68 to enable the memory array to read out a PAT 1 array to the LM-Bus. The absence of an LM-Bus select signal would cause the PAT 1 lines to the B-Bus to be activated by gate 69.

With the line memory of the present invention, the memory contents can be read out, e.g. to the position detector, in a recursive manner. Consequently a search of the data field for white-black transitions, which indicate the character edges, can be simplified. When the MRP wants the position detector to operate it sends a recursive read setup signal to the line memory. This setup signal is put on the B-Bus, is multiplexed onto the internal bus 70 and is stored in the X and Y read command latches when they are strobed by signals formed in gates 65 and 67 when there is coincidence between the OUTPL signal of multiplexer 43 and the X CONT and Y CONT outputs of the decoder 52. The amount that the memory should be incremented after each read of data is also stored in these latches (63 and 64). Since the read out over the LM-Bus will be in 4×4 arrays the increment will usually be four. The actual incrementing of the X and Y addresses which are stored in latches 55 and 56 is by means of 4-bit adders 57 and 58, respectively. The adders, which can be standard integrated circuit units No. 74 LS 283 add the increment stored in the read command latches 63 and 64 to the addresses stored in the address latches 55 and 56 and the sum is again stored in the address latches through the multiplexers 53 and 54. After each increment the 4×4 array is read out on the PAT 1 lines leading to the LM-Bus. This process will continue to output the contents of the memory at time periods controlled by clock 60 until told to stop by the position detector.

Since after this process the MRP needs to know the X and Y address coordinates which caused the position detector to stop, a command for this information (X COOR and Y COOR) is sent over the B-Bus and is decoded by decoder 52, which activates drivers 33 and 34 to supply this information to the B-Bus, If the MRP wants a particular 4×4 array of data it supplies the address of the data sought (usually the address of the uppermost and leftmost bit) and also the pattern it wants. This is decoded in decoder 52 and one of the outputs, i.e. PAT 1, PAT 2, or PAT 3, is supplied to the B-Bus.

Figure 3:
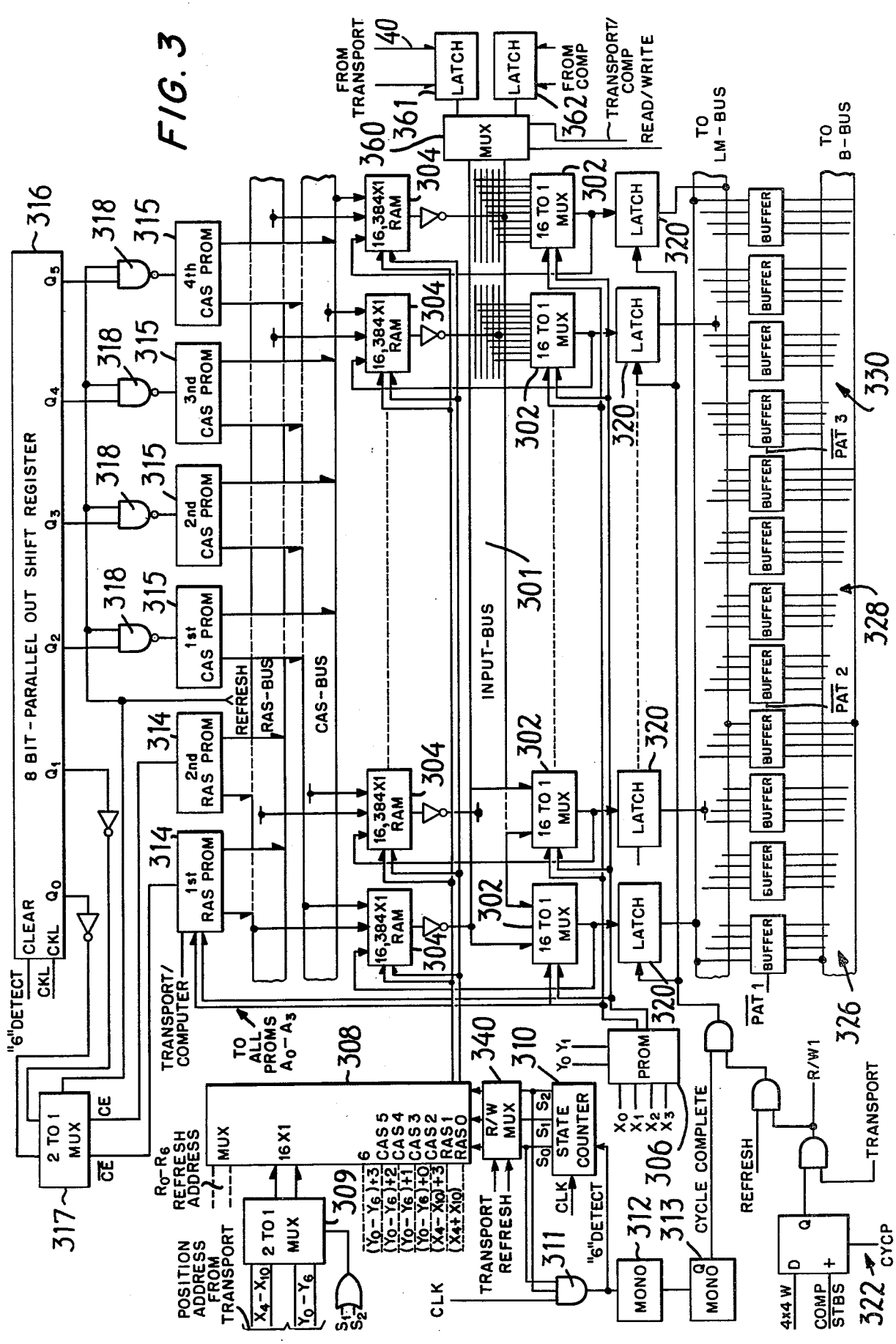
FIG. 3 is a schematic of the line memory array shown in FIG. 2.

A detailed schematic of the memory array 30 is shown in FIG. 3 and a functional arrangement of part of the memory is shown in FIG. 4. The data applied to the memory array appears on input bus 301 which consists of 16 input lines. This data is received rom a multiplexer 360 (e.g. 74 LS 258 units) which selects between the data of transport bus 40 stored in a latch 361 (e.g. 74 LS 174 units) and the data of the B-Bus and LM-Bus (comp) stored in latch 362 (e.g. 74 LS 174 units) on the basis of which devices are sending the information. Sixteen multiplexers 302 are connected to bus 301. Each of these multiplexers is a No. 74150 integrated circuit and is capable of multiplexing any one of the sixteen input lines onto its output. The outputs of the multiplexers are each supplied to the inputs of separate dynamic random access memories (RAMs) 304. The RAMs are integrated circuit units No. MK4116P/3 manufactured by the Mostek Company and are capable of storing 1 × 16,384 bits. Since these are dynamic memories, provisions must be provided for refreshing the contents of them on a periodic basis. Sixteen lines of input data are transferred to the RAMs 304 by the multiplexers 302 under the direction of a programmable read only memory (PROM) 306. The X address information ($X_0$, $X_1$, $X_2$, $X_3$) and the Y address ($Y_0$, $Y_1$) information are applied to the PROM and it activates the proper lines on the multiplexers to sort the information into the correct sequence for storage in the RAMs 304. The PROM can be an integrated circuit unit No. 82 S 23 and it acts as a truth table relating the memory addresses to the memory locations.

Besides applying the proper data to the inputs of the RAM units, the correct address lines on them must be enabled and the row address strobe (RAS) and the column address strobe (CAS) must be correctly activated. In order to accomplish this, a set of multiplexers 308 and 309 (e.g. seven circuit units No. 74 S 151 and two integrated circuit units N. 74 LS 257, respectively) accept position address information from the input source, e.g. the transport, and the address incremented by 1, 2 or 3 in adder circuits (not shown). The output of multiplexer 309 is an input to multiplexer 308, whose output is applied to the address lines of the RAM units 304. Both multiplexers are controlled by a state counter 310 which is updated by the system clock and reset on the detection of a "6" count by AND-gate 311. The state counter lines $S_1$ and $S_2$ are supplied to multiplexer 309 through an OR gate and the state counter lines $S_0$, $S_1$ and $S_2$ are supplied to multiplexer 308 through a 2 to 1 read/write multiplexer 340. As a result the counter has six states which clock the 2 RAS and 4 CAS lines. the counter can be a standard 4 bit counter 74 LS 161. Two monostables (312 and 313) connected in series or other timing components generate a cycle complete signal. The PROM 306 in addition to controlling the multiplexers 302, also controls two X address PROMs 314 and four Y address PROMs 314, all of which can be 82 S 123 units. The outputs of these PROMs are applied to a RAS-bus and a CAS-bus, respectively, which buses supply information to the RAS and CAS inputs of the RAMS 304. The PROMs 314 and 315 are activated by signals from a serial in — parallel out shift register 316, which shifts "1" bits at the system clock times. This register may be a 74164 unit and is cleared at the end of each memory cycle by the "6" detect signal. The $Q_0$ and $Q_1$ outputs of the register 316 are multiplexed through multiplexer 317 (a 74 S 257 unit) to the PROMs 314. The $Q_2$, $Q_3$, $Q_4$ and $Q_5$ outputs are ANDed in gates 318 with a $\overline{refresh}$ signal and are sent to the PROMs 315. The $\overline{refresh}$ signal guarantees that the RAMs are not CAS strobed during a memory refresh cycle. The X address ($_4$ to $X_{10}$) is clocked into the RAMs during the RAS strobe and the Y address data ($Y_0$ to $Y_6$) is put in during the CAS time.

When the contents of the RAMs must be read out the address information supplied with the request for information operates on PROMs 306, 314 and 315 and multiplexers 308 and 309 in order to bring the data up on the outputs of the RAMs, which outputs are connected to input bus 301. The data is then passed through multiplexers 302 so as to arrange it in the proper sequence, e.g. the PAT 1, 4×4 array. A set of latches 320, e.g. integrated circuits 74 LS 174, store this data and hold it on the lines heading to the LM-Bus. The strobes are controlled by a logic circuit 322 which assures that the transport is not requesting access to the memory ($\overline{transport}$), there is no data being written in ($\overline{4\times 4W}$), the refresh cycle is not in progress ($\overline{refresh}$) and the previous memory cycle is complete.

If the data has been requested by the MRP on the B-Bus, one of three sets of buffers (326, 328, or 330) is activated by the signals PAT 1, PAT 2 or PAT 3, respectively. Because of the wiring between the latches 320, the buffers 326, 328, and 330, and the B-Bus, the various configurations can be supplied to the B-Bus. These buffers can be integrated circuits 74368.

The address information supplied when a 4×4 array is to be read out of memory identifies only the upper lefthand corner of the array. In order to get the first row of data "0" is added to the Y address ($Y_0 - Y_6$). When this has been sent out "1" is added to the address to get the next row and so on up to 3. These additions are made in adders not shown and are multiplexed to the four CAS PROMs by multiplexer 308. The two RAS PROMs have the $X_4 - X_{10}$ address and that address with 3 added, supplied to them by the same multiplexer. Clocking of these computations and the multiplexer are under the control of state counter 310.

A functional map of the memory array is shown in FIG. 4. The top number in each location in the map represents one of the sixteen RAMs in the memory and the bottom number represents the number of one of the 16 bit words transferred into the memory. Each RAM stores 1 bit of the 16 bit word, so the word range is 16,383. In a recognition system a line of data from a single line of the document has about 1500 bits thereby allowing the memory to store up to 128 lines of data. These lines, however, are broken up into 16 bit words for storage. In order to access this information in 4×4 arrays of the character field, the chips or RAM number and word number in the array for the upper lefthand corner bit for a 4×4 array must be identified. Once the corner bit is known the chip numbers for the remaining 15 bits of the array can be set up with PROM 306. The chip number is found by adding the $X_0$ to $X_3$ bits of the input address as a word to the $y_0$, $Y_1$ bits shifted two places. The chip number is the lower most four bits. As an example the 4×4 pattern in FIG. 4 with an X address 14 would begin on chip 6, i.e.

|  |  |
|---|---|
| X . X . X | = 1110 |
| shifted Y  Y | = 1000 |
|  | 1⎦0110 decimal 6 |

The word number is a more complicated calculation with 4 different words numbers, i.e. call address, used when a 16 X boundary is not crossed as shown by the darkened square in FIG. 4 at X address 3. Here word numbers 2, 3, 4 and 5 are used. If the square had been further to the right, at X address 14 for example, then 8 different word numbers would have been needed: 2, 130, 3, 131, 4, 132, 5, 133.

The maximum of 8 word number is actually composed of two groups of four word numbers related as follows: The first word number which is for the upper lefthand corner of the square is simply the low order 7 bits of the y address with the X address bits 4 through 10 added; the second word number is the first word number with 128 added to it. This is done when the boundary is crossed. The next pair of word numbers is produced by adding 1 to each of the numbers in the first pair. The third and fourth pairs are similarly produced in the example of FIG. 4 with X address 14. The word numbers are Pair (2—The given Y address + the high order X address
Number (bit—in this case 0
1 (130 —The first word number +128
Pair (3—The first word number + 1
Number (131—The first word number + 1 + 128
2
Pair (4—The first word number + 2
Number (132—The first word + 2 + 128
3
Pair (5—The first word number +3
Number (133—The first word number + 3+ 128
4

If adding 1, 2 or 3 causes a 7-bit overflow, there is no carry. This allows the memory to have a Y wraparound appearance.

The decision to use 8 word numbers instead of 4 is made by taking the X address and adding 3 to it and then arranging the bits as shown. In the X address 14 example of FIG. 4.

|  | $XA_{10}$ |  |  |  |  |  | $XA_4$ |  |  | $XA_0$ |
|---|---|---|---|---|---|---|---|---|---|---|
| x = 14 = | 0 | 0 | 0 | 0 | 0 | 0 | 0 | 1 | 1 | 1 | 0 |
| x = 3 = 17 = | 0 | 0 | 0 | 0 | 0 | 0 | 1 | 1 | 0 | 0 | 1 |

A boundary is crossed if the $XA_4$ bit changes after the addition. In all references in this description, binary words are numbered 0-N where 0 is the least significant bit. Since carries are not permitted in the 7-bit Y coordinate additions, all 8-word numbers share only two possible RAS addresses.

Relating the address schemes to the circuit hardware, in all 4×4 patterns, only 1 to 2 high order bit patterns are possible (not all 4). Therefore, only 2 multiplexer time slots need be reserved for the high order bits.

For video (transport) or refresh cycles, the multiplexer 308 address (time slot) is jammed; for 4×4 patterns, the multiplexer 308 runs from 0 to 5. For a 4×4 pattern, first the RAS addresses are calculated and wired to the first two time slots of the multiplexer 308, and the Y address coming out of adders is wired to the next 4 slots. Also the chip number is calculated and sent out to the data multiplexers 302 and to the 6 PROMs 314 and 315.

The 6 phase cycle now begins under the control of shift register 316 and state counter 310 both driven by a clock signal. The first PROM 314 is enabled (by the shift reg) and it clocks the RAS clock into selected RAMS while the non-added high order 7 address bits (time slot 0) are on the RAM address buses. Next the state counter advances the multiplexer 308 to time slot 1 and the shift register enables the second PROM 314 (also a RAS clock). This is repeated four more times to clock the CAS lines.

At this point, all RAMs are addressed and, if this is a read cycle, the data would be strobed into the output latches 320, passed through one of three pattern selecting bus buffers (326, 328 or 330) and be put out to the MRP. If this was a 4×4 write cycle, the cycle would have been complete at the last CAS clock. Read/write is a static control set at the beginning of each cycle. Once the cycle is complete, the state counter and shift register are cleared, the RAMs precharged for the next cycle and the $\overline{BUSY}$ signal is sent to the line memory controller releasing the ADACK signal.

For a 1 × 16 transport write, the word number address has $X_4 - X_{10}$ as the RAS and $Y_0 - Y_6$ as the CAS. It is not necessary to use the Y adder since data is being written on only a single line. The chip number PROM 306, RAS and CAS PROMs 314 and 315 and the data multiplexers 302 are used just as in a 4×4 write. The address multiplexer 308 is jammed to 6 (transport write) by multiplexer 340 and the high order RAS address is put through multiplexer 309, which feeds address time slot 6. This is done for two clock times. Then the multiplexer switches to the low order 7 bits (CAS) and puts them out to the RAMs. This takes four clocks. At this point, the cycle ends as if it were a 4×4 cycle.

Refresh cycles work only on the high order 7 bits of the RAM address (RAS bits) and these come from a 7-bit refresh counter (not shown) and are multiplexed on to the address bus via address multiplexer 308 time slot number 7 to which the multiplexer is jammed by multiplexer 340. Neither PROM 306 nor the X+3 or Y adders are used and the address system is not used. The address comes directly from the refresh counter. The first refresh address goes out and remains for two clocks of the RAS (the RAS and CAS PROMs are jammed ON and OFF respectively). Then, for one clock, the RAMs are precharged and the refresh counter is incremented by 1 and the cycle repeats. In each cycle of 900 ns, two rows are refreshed out of the 128. Thus, only 64 refresh cycles are required. This cycle ends the same way as a 4×4 cycle. Naturally if static, as opposed to dynamic, memories are used the refresh operation can be eliminated.

The refresh, transport, and MRP cycles may all be coordinated by a priority circuit (not shown) which accepts requests to use the line memory and then gives the memory to the highest priority request. In the case of a MRP request, this circuit also handles the ready/busy signal. If a request comes in while the memory is in use, that request is held until the memory is free. Then it is acted upon unless a higher priority request comes in, in which case that request is granted first and the other one is stacked. Refresh is only requested every 1.5 ms, at which time it is given priority 1 (the lowest) so as not to interfere with the MRP's or transport's use of the line memory. If all 64 cycles are completed before 1.7 ms, the refresh remains priority 1, if not, the MRP is made priority 1 and the refresh moves up to priority 2 for the remaining few cycles. The transport is always kept at priority 4 (the highest) and is never interfered with. Therefore, no transport buffer is required. Refresh is buried by this priority system and is transparent to both the MRP and transport. Refresh uses memory less than 6% of the time and almost without slowing the line memory at all.

The ability of the memory to store lines of data and to read out 4×4 arrays is dependent on the multiplexers 302.

Also, the accessability of the memory contents is independent of the MRP or the B-bus.

While the present invention has been particularly shown and described with reference to a preferred embodiment thereof, it will be understood by those skilled in the art that various changes in form and details may be made therein without departing from the spirit and scope of the invention.

We claim:

1. A line memory for use in a character recognition system comprising:

a plurality of random access memory units, each memory unit being capable of storing a plurality of one bit words, each memory unit having appropriate address controls;

a plurality of multiplexers, one for each of the memory units, said multiplexers having as many inputs as there are memory units and being adapted to transfer any one of these inputs to its output on command, the outputs of said multiplexers being connected to the inputs of said memory units;

an input data bus with the inputs of each multiplexer connected to separate lines of the input data bus, the outputs of the memory units being connected to separate lines of said input data bus;

a plurality of latch circuits for storing the outputs of the multiplexers;

a memory control circuit means for controlling the multiplexers and address controls on the memory units so as to store lines of data presented on the input data bus in parallel blocks and to supply two-dimensional arrays of the stored data to the latch circuits;

a controller bus for supplying data to the memory and instructions to the memory control circuit to bring about the control of the multiplexers and the address controls of the memory units; and a line memory bus for supplying data from the latch circuits to sub-assemblies of the character recognition system, for supplying data to the input data bus and for supplying requests for data to the memory control circuit to bring about the control of the multiplexers and the address control of the memory units.

2. A line memory as claimed in claim 1 further including a second plurality of multiplexers for selecting between the data and information on the controller bus and the data and information on the line memory bus.

3. A line memory as claimed in claim 1 wherein the memory control circuit includes a recursive circuit for automatically reading out a plurality of two-dimensional arrays of the stored data comprising:

means for storing the address of the array to be read out;

means for storing an increment by which the address must be changed to get the next array ; and means for adding the address to the increment and storing it as the address of the next array to be read out.

4. A line memory as claimed in claim 1 further including a plurality of activatable driver circuits connected between the outputs of the latch circuits and the controller bus, each group of drivers being wired different than the other groups so as to rearrange the two dimensional arrays supplied to the controller bus depending on which group is activated.

* * * * *